United States Patent
Al-Shanqity et al.

(10) Patent No.: US 11,170,118 B2
(45) Date of Patent: Nov. 9, 2021

(54) NETWORK SYSTEM AND METHOD FOR ACCESS MANAGEMENT AUTHENTICATION AND AUTHORIZATION

(71) Applicant: Saudi Arabian Oil Company, Dhahran (SA)

(72) Inventors: M Weam Al-Shanqity, Dhahran (SA); Mohamed Faizal Kooliyattayil Saidali, Al Khobar (SA); Eman A Al Abdulraheem, Dhahran (SA); Mohammad H Fraihat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 43 days.

(21) Appl. No.: 16/659,076

(22) Filed: Oct. 21, 2019

(65) Prior Publication Data

US 2021/0117557 A1  Apr. 22, 2021

(51) Int. Cl.
*H04L 29/06* (2006.01)
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2129* (2013.01); *G06F 2221/2141* (2013.01)

(58) Field of Classification Search
CPC ............... G06F 21/604; G06F 21/6218; G06F 2221/2129; G06F 2221/2141
See application file for complete search history.

(56) References Cited

U.S. PATENT DOCUMENTS

| | | | | |
|---|---|---|---|---|
| 6,385,653 B1* | 5/2002 | Sitaraman | ............... | H04L 69/18 709/203 |
| 8,365,254 B2* | 1/2013 | Burke | .................. | G06F 21/604 726/4 |
| 8,515,948 B2* | 8/2013 | Chen | .................... | G06F 21/604 707/717 |
| 8,843,997 B1* | 9/2014 | Hare | .................. | H04L 63/0815 726/3 |

(Continued)

OTHER PUBLICATIONS

Joon S. Park et al., Role-based Access Control for Collaborative Enterprise In Peer-to-Peer Computing Environments, Jun. 2003, ACM, pp. 93-99. (Year: 2003).*

(Continued)

*Primary Examiner* — Luu T Pham
*Assistant Examiner* — Fahimeh Mohammadi
(74) *Attorney, Agent, or Firm* — Leason Ellis LLP

(57) ABSTRACT

A technology solution, including a method, a system, and a computer program for receiving, processing, and managing access requests in a network system, including autonomously processing and managing access requests to one or more information technology (IT) domains in the network system. The technology solution can include receiving an access request for the computing resource at the node, determining a service type and one or more validation criteria from information included in the access request, comparing the service type and the one or more validation criteria to a validation table, and automatically creating, renewing, modifying or revoking access privileges of a network user at the computing resource at the node without any user intervention.

14 Claims, 15 Drawing Sheets

(56) References Cited

U.S. PATENT DOCUMENTS

| | | | | |
|---|---|---|---|---|
| 9,413,739 | B1* | 8/2016 | Rose | H04L 63/10 |
| 9,838,376 | B1 | 12/2017 | Lander et al. | |
| 10,101,972 | B1 | 10/2018 | Nelson et al. | |
| 2004/0250120 | A1* | 12/2004 | Ng | G06F 21/6227 726/17 |
| 2005/0039050 | A1* | 2/2005 | Morand | H04L 63/0892 726/4 |
| 2005/0097441 | A1* | 5/2005 | Herbach | G06F 21/10 715/229 |
| 2011/0258683 | A1 | 10/2011 | Cicchitto | |
| 2013/0024914 | A1* | 1/2013 | Ahmed | H04W 12/08 726/4 |
| 2013/0304765 | A1* | 11/2013 | Failelson | G06F 21/6218 707/785 |
| 2015/0143472 | A1* | 5/2015 | Kim | H04W 12/069 726/4 |
| 2015/0341338 | A1* | 11/2015 | Zmener | H04L 63/20 726/4 |
| 2016/0073441 | A1* | 3/2016 | Faccin | H04L 12/4641 370/329 |
| 2016/0173406 | A1* | 6/2016 | Geller | G06F 9/468 709/225 |
| 2020/0074048 | A1* | 3/2020 | Subramaniam | H04L 63/083 |

OTHER PUBLICATIONS

Paolina Centonze et al., Role-Based Access Control Consistency Validation, Jul. 21, 2006, ACM, pp. 121-132. (Year: 2006).*

Min Li et al., MyCloud: On-Demand Virtual Cluster Provisioning on HPC Resources, Nov. 13-15, 2013, IEEE, pp. 72-76. (Year: 2013).*

Jeffrey S. Chase et al., Dynamic Virtual Clusters in a Grid Site Manager, Jun. 22-24, 2003, IEEE, pp. 1-11. (Year: 2003).*

Anonymous, "Systems Access Request Business Process Guide," published by the California State University, Jan. 3, 2014.

No Author.,"NetIQ Identity Manager Administrator's Guide to the Identity Applications Part I", 2018, NetIQ.com, "https://www.netiq.com/documentation/identity-manager-47/pdfdoc/identity_apps_admin/identity_apps_admin.pdf" PDF file. 51 pages.

No Author.,"NetIQ Identity Manager Administrator's Guide to the Identity Applications Parts III-IV", 2018, NetIQ.com, "https://www.netiq.com/documentation/identity-manager-47/pdfdoc/identity_apps_admin/identity_apps_admin.pdf" PDF file. 144 pages.

International Search Report and Written Opinion in Corresponding PCT Application No. PCT/US2020/056711 dated Feb. 16, 2021. 12 pages.

* cited by examiner

404AR

SERVICE REQUEST: NEW – ACCESS AUTHORIZATION SERVICES : NETWORK ENGINEER APPLICATION ACCESS

SERVICE HEADER

GENERAL

Requested For: ☐
Organization: ☐
Requestor: ☐
Site Contact: ☐

SERVICE DETAILS

Service Type: ☐
Production Database Granted: ☐
User Type: ☐
Computer / Laptop Physical ID: ☐

Area of Interest
☐ Inside Plant (ISP)
☐ Outside Plant (OSP)

Geographic Area of Interest
☐ All
☐ Central Area
☐ East Region 1
☐ West Region 2
☐ South Region 3
☐ North Region 4

JUSTIFICATION

ADDITIONAL INFORMATION

FIG. 9

404ARUR

| REQUEST INFORMATION | | | | |
|---|---|---|---|---|
| Title: Network Engineer Application Access | | Request # 123456789 | | |
| Requester Name: Mr. XYZ | Requester Org: Hardware Group | | | Request Date:7/24/19 |
| Current Responsible Employee: Employee 1 | Status: Closed | | Current Step: End of Service Request | |

| DETAILS | | | | |
|---|---|---|---|---|

| GENERAL INFORMATION | | | | |
|---|---|---|---|---|
| FIELD NAME | | SELECTED VIEW | | |
| Area of Interest | Inside Plant (ISP), Outside Plant (OSP) | | | |
| Computer / Laptop Physical ID | | | | |
| Access Expiration Date | 9/30/2019 | | | |
| Geographical Area of interest | Central Area, East Region 1, West Region 2, South Region 3, North Region 4 | | | |
| Service Type | Renew | | | |
| User Type | Company | | | |

| NOTES | | | | |
|---|---|---|---|---|
| Justification: | | | | |
| Log: Note – 07/15/2019 – 13:08:40 – Complete – ABCD01  ‖  Note – 07/15/2019 – 13:39:04 – Complete – ABCD01  ‖  Note – 07/15/2019 – 15:30:52 – Complete – EFGH02 | | | | |

| AUTO APPROVAL | | | | |
|---|---|---|---|---|
| AGENT TITLE | AGENT NAME | AGENT POSITION TITLE | STATUS | STATUS DATE |
| Reviewer | Agent 01 | Computer Operating System Specialist I | Completed | 07/15/2019 |
| Reviewer | Agent 02 | Acting – Support Area Information Tech | Completed | 07/15/2019 |
| Reviewer | Agent 03 | Chief Suveyor | Completed | 07/15/2019 |

SERVICE INITIATION VIEW FIELDS

| STEP NUMBER | FIELD (ATTRIBUTE) | DESCRIPTION | TYPE | VALUE SELECTION | DEFAULT | VALIDATE (ON) | DEPENDENCY | REQUIRED | READ ONLY |
|---|---|---|---|---|---|---|---|---|---|
| 1 | Service Type | | Dropdown List | New / Renew / Modify / Revoke | | | | YES | |
| 2 | Access Type | | Dropdown List | View / Admin / Edit | | | If Service Type = New, Renew, Revoke | YES | |
| 3 | Information | | Note | Admin role requires manager approval while other roles require division head approval. | | | | | |
| 4 | Access Type Modification | | Dropdown List | View to Edit / View to Admin / Edit to View / Edit to Admin / Admin to View / Admin to Edit | | | If Service Type = Modify | YES | |
| 5 | Warning | | Note | Database Account for Requestor must be created in ORAOXYZ. If account is not Created, then request will be rejected at the processing stage. | | | | YES | |
| 6 | Modified Database Privilege | | Check List | Network_Engineer_User | | | If Service Type = Modify & Access Type = View to Edit or View to Admin or Edit to Admin or Admin to Edit | | YES |

FIG. 11A

| | | | | | 404VT (CONT'D) | |
|---|---|---|---|---|---|---|
| 7 | Modified Database Privilege | | Check List | Network_Engineer_User | | | |
| 8 | Production Database Granted | ORADXYZ | Radio Button | ORADXYZ | ORADXYZ | | YES |
| 9 | User Type | | Radio Button | Company A<br>SMP<br>Contractor | Company | YES | YES |
| 10 | Computer/Laptop Physical ID | BCXXXXX | Text (Short Text) | | | | YES |
| 11 | Information | | Note | | Owner of device must be Requestor otherwise request is rejected | YES | YES |
| 12 | Area of Interest | | Check List | Inside Plant (ISP)<br>Outside Plant (OSP) | NA | | |
| 13 | Geographical Area of Interest | | Check Box | All<br>Central Area<br>East Region 1<br>West Region 2<br>South Region 3<br>North Region 4 | | YES | YES |
| 14 | Expiration Date | Access Expiration Date | Date | | 360 days from submission date. | New, Renew, Modify | YES, only when this field is activated |

SERVICE PROVIDER FIELDS

| STEP NUMBER | FIELD (ATTRIBUTE) | DESCRIPTION | TYPE | VALUE SELECTION | DEFAULT | VALIDATE (ON) | DEPENDENCY | REQUIRED | READ ONLY |
|---|---|---|---|---|---|---|---|---|---|
| 1 | Requested for | | Text (Short Text) | N/A | Employee Name | | | YES | YES |
| 2 | Organization | | Text (Short Text) | N/A | Org Name | | | YES | YES |
| 3 | Initiator | | Text (Short Text) | N/A | Initiator Name | | | YES | YES |
| 4 | Admin Database Privileges | | Check List | Network_Engineer_User, SSOComm_RL, RL_Gen_Role, SSOReserve_RL, Sdesp4_RL, DBMS_Pipe, DBMS_Look | | | If Access Type = Admin & Service Type = New, Resolve | YES | |
| 5 | Edit Database Privileges | | Check List | Network_Engineer_User, SSOComm_RL, RL_Gen_Role, SSOReserve_RL, Sdesp4_RL, DBMS_Pipe, DBMS_Look | | | If Access Type = Edit & Service Type = New, Resolve | YES | |
| 6 | View Database Privileges | | Check List | Network_Engineer_User, SSOComm_RL, RL_Gen_Role, SSOReserve_RL, Sdesp4_RL, DBMS_Pipe, DBMS_Look | | | If Access Type = View & Service Type = New, Resolve | YES | |

FIG. 11C

NETWORK SYSTEM AND METHOD FOR ACCESS MANAGEMENT AUTHENTICATION AND AUTHORIZATION

FIELD OF THE DISCLOSURE

The present disclosure relates to a system, a method, and a computer program for receiving, processing, and managing access requests in a network system, including autonomously processing and managing access requests to one or more information technology (IT) domains in the network system.

BACKGROUND OF THE DISCLOSURE

In network systems, it is necessary to provision network users with access to certain IT domains that are necessary for them to perform their work. As roles and responsibilities change over time, or as new users are added or removed from a network, it is frequently necessary to grant, modify or revoke access privileges to certain IT domains by network users. There exists an urgent unfulfilled need for a technology solution that can autonomously manage aspects of network user privileges, without any human intervention.

SUMMARY OF THE DISCLOSURE

The disclosure provides a novel technology solution, including a method, a system, and a computer program for receiving, processing, and managing access requests in a network system, including autonomously processing and managing access requests to one or more information technology (IT) domains in the network system. According to a non-limiting embodiment of the disclosure, a method is provided for automatically provisioning access privileges for a computing resource at a node in a computer network which includes a plurality of nodes. The method comprises receiving an access request for the computing resource at the node, determining a service type and one or more validation criteria from information included in the access request, comparing the service type and the one or more validation criteria to a validation table, and automatically creating, renewing, modifying or revoking access privileges of a network user at the computing resource at the node without any user intervention.

The method can further comprise transmitting a trigger to the computing resource to compare the service type and the one or more validation criteria to the validation table and apply access privileges included in the access request for the network user to the computing resource. Automatically creating, renewing, modifying or revoking access privileges of the network user at the computing resource at the node without any user intervention can be executed by the computing resource in response to the trigger.

The computing resource can comprise a database server located in an information technology domain.

The method can further comprise transmitting a trigger to a network inventory system (NIS). The network inventory system (NIS) can comprise an information technology (IT) inventory server.

The validation criteria can include an access type, a user type, a computing resource identification, an area of interest, or a subarea of interest.

The method can further comprise transmitting a trigger to a network inventory system (NIS), wherein the trigger transmitted to the computing resource and the trigger transmitted to the network inventory system are sent by an automated approval application engine.

The access privileges can comprise viewing, editing or administrator privileges.

According to another non-limiting embodiment of the disclosure, a system is provided for automatically provisioning access privileges for a node in a computer network that includes a plurality of nodes. The system comprises a network authentication and authorization ($NA^3$) controller that: receives an access request for said node in the computer network; determines a service type and one or more validation criteria from information included in the access request; and transmits a trigger to a computing resource located at said node to compare the service type and the one or more validation criteria to validation criteria in a validation table, wherein the computing resource at said node automatically creates, renews, modifies or revokes access privileges of a network user without any user intervention. The network authentication and authorization ($NA^3$) controller can transmit a further trigger to a network inventory system (NIS). The computing resource can comprise a database server. The network inventory system (NIS) can comprise an information technology (IT) inventory server. The validation criteria can include an access type, a user type, a computing resource identification, an area of interest, or a subarea of interest.

According to another non-limiting embodiment of the disclosure, a non-transitory computer readable storage medium is provided that stores instructions for automatically, without any user intervention, provisioning access privileges for a computing resource at a node in a computer network that includes a plurality of nodes comprising machine executable code which when executed by at least one computing device, causes the at least one computing device to perform steps comprising receiving an access request for the computing resource at the node, determining a service type and one or more validation criteria from information included in the access request, comparing the service type and the one or more validation criteria to a validation table, and automatically creating, renewing, modifying or revoking access privileges of a network user at the computing resource at the node without any user intervention. The instructions can cause the at least one computing device to perform steps comprising transmitting a trigger to the computing resource to compare the service type and the one or more validation criteria to the validation table, and apply access privileges included in the access request for the network user to the computing resource. The automatically creating, renewing, modifying or revoking access privileges of the network user at the computing resource at the node without any user intervention can be executed by the computing resource in response to the trigger. The computing resource can comprise a database server located in an information technology domain. The instructions can cause the at least one computing device to a perform step comprising transmitting a trigger to a network inventory system (NIS). The instructions can further cause the at least one computing device to perform a step comprising transmitting a trigger to a network inventory system (NIS), wherein the trigger transmitted to the computing resource and the trigger transmitted to the network inventory system are sent by an automated approval application engine.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 9 shows an embodiment of an access request graphic user interface that includes data fields that can be included in an access request.

FIG. 10 shows an embodiment of an access request record that can be populated with data from an access request.

FIGS. 11A to 11C show an embodiment of a validation table having valuation criteria that can define permissible criteria for automatically granting, renewing, modifying or revoking access privileges to an IT domain in the network in FIG. 2.

Figure 1:
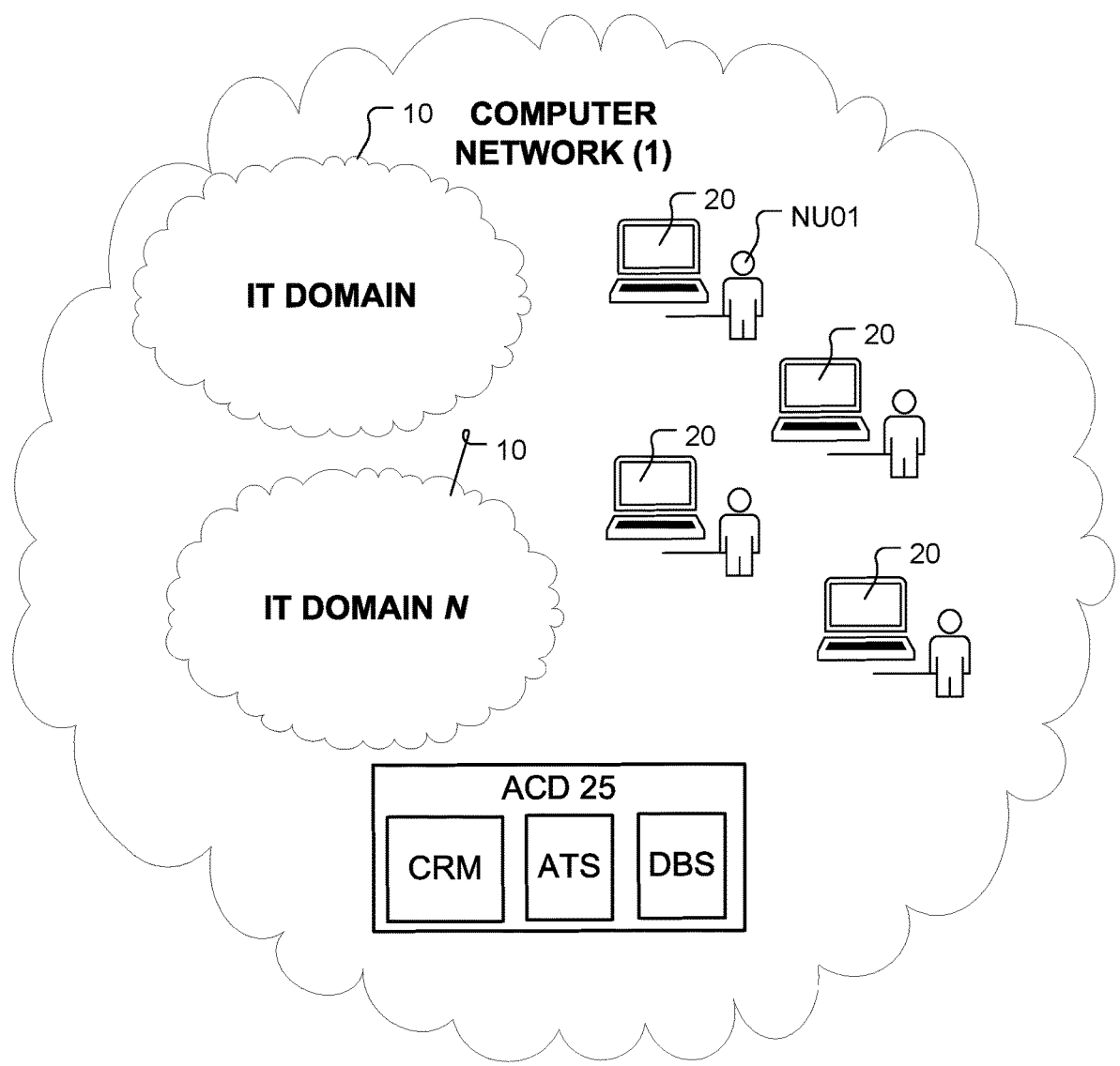
FIG. 1 shows a non-limiting example of a computer network.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 shows a non-limiting example of a computer network 1 having a plurality of nodes that can be grouped into one or more information technology (IT) domains 10, such as, for example, N IT domains, where N is a non-zero positive integer. The IT domain 10 can include a single node or a plurality of nodes. The IT domain 10 can include one or more communicating devices (not shown), such as, for example, a database server (not shown). The network 1 can include, for example, tens, hundreds, thousands, millions, billions, or more nodes, any of which can be grouped into an IT domain 10. The network 1 can include a communicating device 20 at each node, or fewer than each node in the network. The network 1 can include an administrator communicating device (ACD) 25. Each node in the network 1 can be identified by and located based on a Node Location Identifier (NLID), which can include the node's physical or virtual address.

An IT administrator can be tasked with provisioning, via the ACD 25, a network user (NU01) at a communicating device 20 with access to the IT domain 10 that the network user NU01 needs to access to perform work. The ACD 25 can include a Computing Resource Management (CRM) system. The ACD 25 can include an administrator toolbox server (ATS) and an internal database server (DBS). As roles or responsibilities change over time for network users, or as network users are added or removed from the computer network 1, the IT administrator may have to frequently grant, modify, renew or revoke access rights of network users, or configure access privileges of network users for IT domains in the network via the ACD 25. However, this can require a long and tedious workflow approval process that can begin with the completion and submission of a workorder that, after approval by a first line supervisor, has to be forwarded through various IT and managerial layers of supervision and approval before any changes to access privileges can be made.

For example, when the network user NU01 needs access granted or modified to the IT domain N 10, which can include, for example, a database server (not shown) containing high resolution satellite imagery data to perform spatial queries or analysis, a workorder has to be filled out to request access for the network user NU01 to the IT domain N. The completed workorder then must be sent physically to a group supervisor, who then needs to review the access request and decide whether to assign an engineer to work on the workorder request. Assuming the group supervisor approves and assigns an engineer to work on the request, the engineer has to complete a database access form, and have it reviewed and approved by the supervisor and forwarded to the requesting network user. This process can be lengthy, resource intensive, and susceptible to errors.

Figure 2:
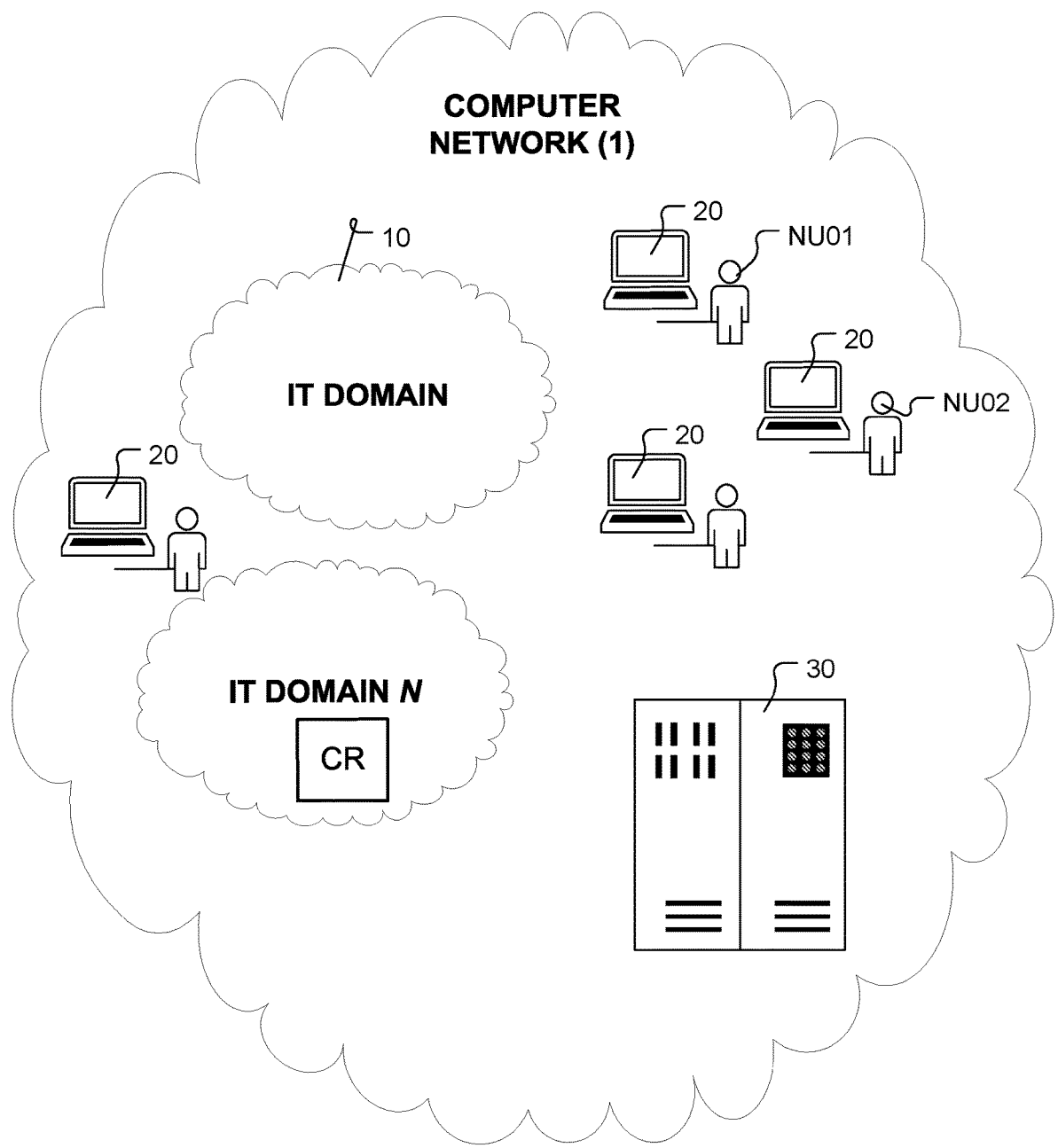
FIG. 2 shows an embodiment of the computer network in FIG. 1 provided with an embodiment of a network authentication and authorization ($NA^3$) system.

FIG. 2 shows an example of the computer network 1 provided with an embodiment of a network authentication and authorization ($NA^3$) system 30, constructed according to the principles of the disclosure. The $NA^3$ system 30 can be located at one or more nodes in the network 1. For instance, the $NA^3$ system 30 can be distributed across multiple nodes in the network 1, or the $NA^3$ system 30 can be located in a cloud network (not shown). The cloud network can be included in the computer network 1, or it can be located outside the computer network 1. The $NA^3$ system 30 can include or be integrated with the ACD 25. The IT domain N can include a computing resource (CR) such as, for example, a database server.

Figure 3:
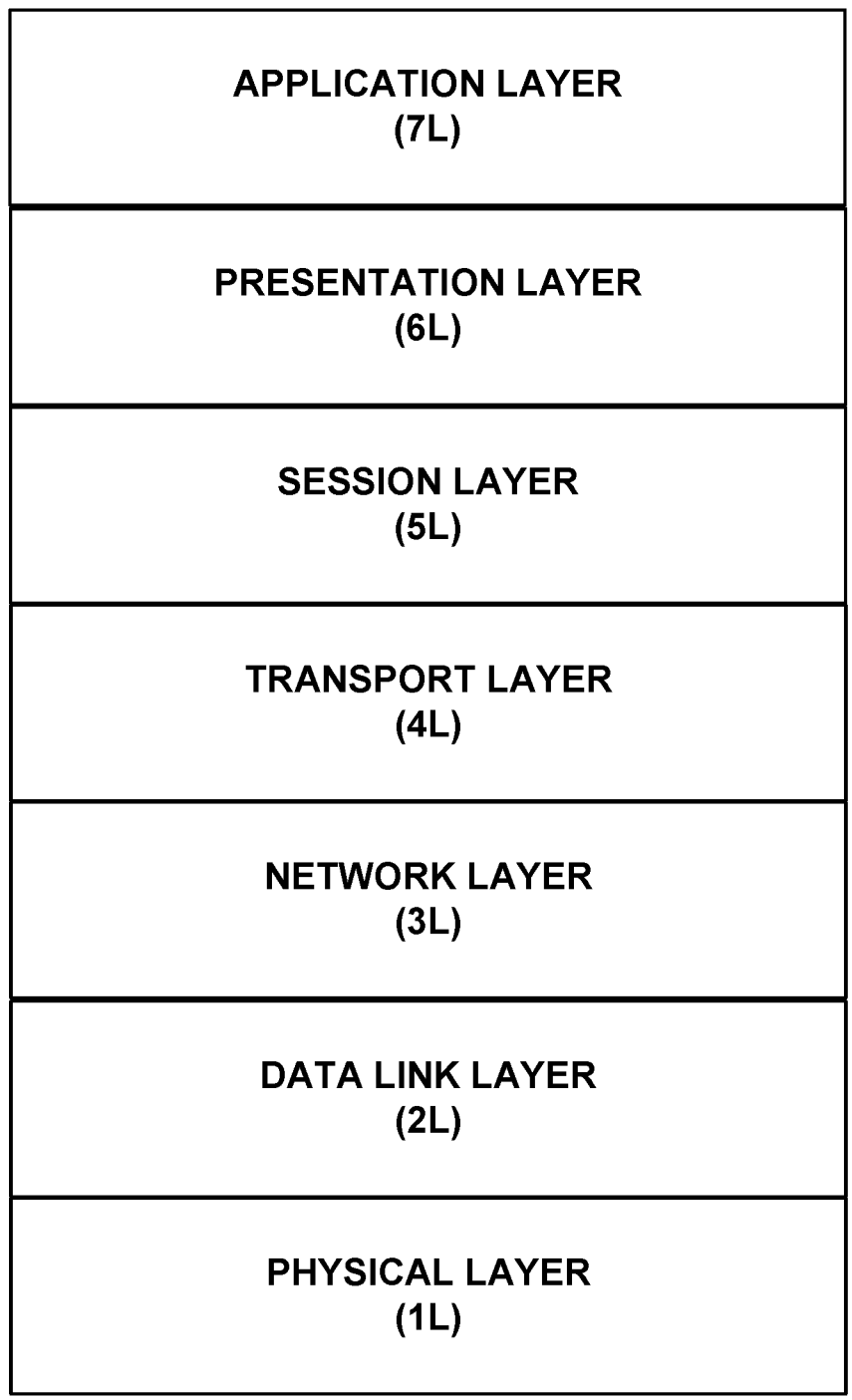
FIG. 3 depicts the Open Systems Interconnection (OSI) model.

FIG. 3 depicts the Open Systems Interconnection (OSI) model. The computing resources in the computer network 1, including the IT domains 10, the communicating devices 20, and the $NA^3$ system 30, can operate at any one or more of the seven layers (1L to 7L) in the OSI model. Beginning with the bottommost layer 1L in the OSI model, which includes the physical structure, and moving through the various layers toward the uppermost layer 7L, the OSI model includes a physical layer 1L, a data link layer 2L, a network layer 3L, a transport layer 4L, a session layer 5L, a presentation layer 6L, and an application layer 7L.

The uppermost layer in the OSI model is the application layer 7L. The application layer 7L is the OSI layer in a computing resource that can be closest to the end user. The application layer 7L interacts with software applications in the computing resource that implement a communicating component. The application layer 7L can include, for example, a graphic user interface (GUI), a user interface (UI), a human user interface (HUI), a search engine or any other software application which an end user can interact with to carry out a functionality.

The presentation layer 6L is the next layer in the OSI model. The presentation layer 6L can establish context between software applications, which can use different syntax or semantics. The presentation layer 6L can transform data into a form that each software application can accept. An operating system is one non-limiting example of the presentation layer 6L.

The session layer 5L controls the connections between computing resources in the computer network 1, including the IT domain 10, communicating devices 20, and $NA^3$ system 30. This layer can be responsible for establishing, managing and terminating connections between local and remote computing resources. The layer can provide for full-duplex, half-duplex, or simplex operations, and can be responsible for establishing checkpointing, adjournment, termination, or restart procedures.

The transport layer 4L can provide the functional or procedural mechanisms for transferring variable-length data sequences from a source computing resource to a destination computing resource, while maintaining quality-of-service (QoS). The transport layer 4L can control the reliability of a given communication link through, for example, flow control, segmentation and desegmentation, or error control. The transport layer 4L can include, for example, tunneling protocols, the Transmission Control Protocol (TCP) and the User Datagram Protocol (UDP).

The network layer 3L can provide the functional or procedural mechanisms for transferring data packets from a node in the computer network 1 to another node in the computer network 1 or in a different computer network (not shown). If the data to be transmitted is too large, the network layer 3L can facilitate splitting the data into a plurality of data segments at the node and sending the data fragments independently to the other node, where the data segments can be reassembled to recreate the transmitted data. The network layer 3L can include one or more layer-management protocols such as, for example, routing protocols, multicast group management, network layer information and error, and network layer address assignment.

The data link layer 2L can be responsible for node-to-node transfer between computing resources in a communication system. In IEEE 802 implementations, the data link layer 2L can be divided into two sublayers, consisting of a medium access control (MAC) layer and a logical link control (LLC) layer. The MAC layer can be responsible for controlling how computing resources in the computer network 1 gain access to a medium or permission to transmit data. The LLC layer can be responsible for identifying and encapsulating network layer protocols, and for controlling error checking and frame synchronization.

The physical layer 1L can include physical structure such as hardware that can connect the computing resources in the computer network 1, including the IT domain 10, computing devices 20, and $NA^3$ system 30. The hardware can include, for example, connectors, cables, or switches that can facilitate transmission and reception of instructions and data streams between the computing resources.

When communicating in the computer network 1 or across one or more computer networks (not shown), such as, for example, the Internet, each node in the computer network 1 can be identified by the Node Location Identifier (NLID). The NLID can include, for example, an Internet Protocol (IP) address, a Media Access Control (MAC) address, an Ethernet Hardware Address (EHA), a network address, a hardware address, an adapter address, a geolocation, or any physical address or virtual address. The IP address can include a 32-bit number (e.g., IPv4) or a 128-bit number (IPv6). The IP address can serve two primary functions. The IP address can identify the node in the computer network 1, and the IP address can identify the location of the node in the computer network 1.

Figure 4:
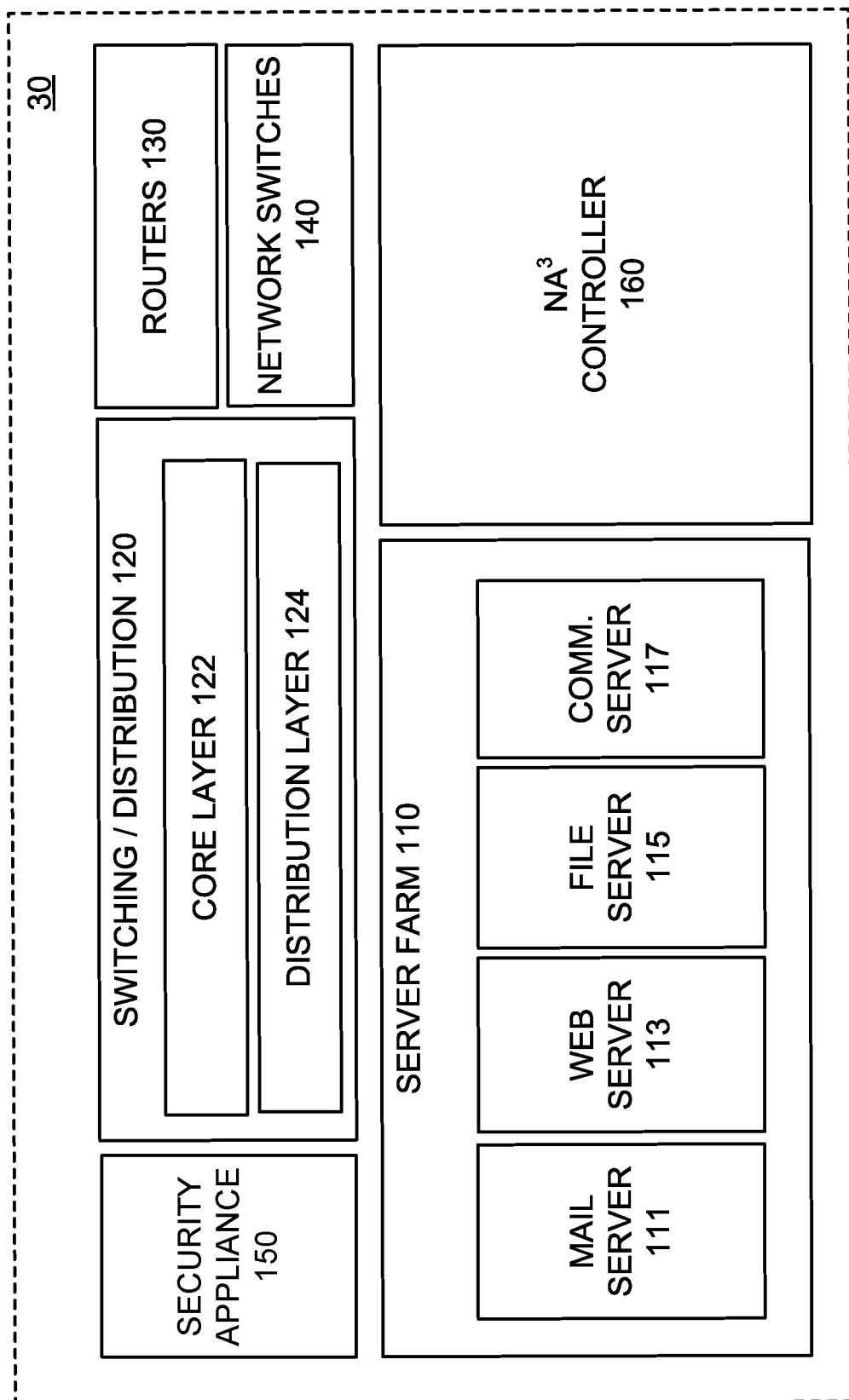
FIG. 4 shows an embodiment of the $NA^3$ system in FIG. 2.

FIG. 4 shows a non-limiting embodiment of the $NA^3$ system 30, constructed according to the principles of the disclosure. The $NA^3$ system 30 can include a server farm 110, switching and distribution layers 120, routers 130, network switches 140, a security appliance 150, and a network authentication and authorization ($NA^3$) controller 160, any of which can be interconnected by communication links.

The server farm 110 can include a plurality of servers, including a mail server 111, a web server 113, a file server 115, and a communication server 117. The server farm 110 can include a firewall (not shown). The server farm 110 can be located in the network 1, or the server farm 110 (or any of the servers 111 to 117 in the server farm 110) can be located outside the network 1, such as, for example, in a cloud network (not shown). The server farm 110 can include large numbers (for example, thousands, or more) of computing resources that can be made accessible to network users via, for example, the communicating devices 20.

The mail server 111 can send, receive or store electronic mail (e-mail) for the network users in the computer network 10. The mail server 111 can send or receive e-mail using standard email protocols, such as, for example, SMTP, IMAP, or POPS.

The web server 113 can be connected to the Internet and can support physical data interchange with communicating devices 20 connected to the Internet or in the computer network 1. The web server 113 can include a static web server (not shown) or a dynamic web server (not shown).

The file server 115 can be responsible for the central storage and management of data files in the network 1. The file server 115 can include a database. The file server 115 can include data, which can be stored as data records or files, that can be accessed by the computing resources in the computer network 1. The file server can include the CRM system (shown in FIG. 1), the ATS (shown in FIG. 1), or the DBS (shown in FIG. 1). The ATS can include an information technology (IT) inventory system server. The DBS can include an IT inventory system database server.

The communication server 117 can include a standards-based computing resource that can operate as a carrier-grade common platform for a wide range of communications applications and facilitate communication over, for example, a public switched telephone network (PSTN) (not shown) or a public land mobile network (PLMN) (not shown). The communication server 117 can include or be connected to a short message service (SMS) gateway (not shown) that can be connected to one or more modems (not shown) to transmit SMS messages over the PSTN or PLMN. The communication server 117 can include Internet message handling services (MHS) that can transfer electronic mail messages between computing resources in the network 1, or between computing resources in the network 1 and computing resources located outside the network 1.

The switching and distribution layers 120 can include a core layer 122 and a distribution layer 124. The core layer 122 can include one or more layers of switching devices (not shown) that connect the computing resources in the $NA^3$ system 30 to the distribution layer 124. The distribution layer 124 can include one or more layers of switching devices (not shown) that connect the core layer 122 to one or more routers 130, one or more network switches 140, the communication server 117, or the security appliance 150. The switching and distribution layers 120 can include one or more routers (not shown).

The routers 130 can be connected to nodes in the network 1 or to nodes outside the network 1, such as in an external network (not shown), by communication links. The router(s) 130 can include a firewall (not shown).

The network switch(es) 140 can be connected to computing resources in the network 1, including the communicating devices 20 (shown in FIG. 2) and the $NA^3$ system 30, by communication links. The network switch(es) 140 can include ethernet switches. Data packets can be securely transported between computing resources in the network 1.

The security appliance 150 can include computing resources such as, for example, hardware, firmware, or software that can provide malware protection, application visibility and control, reporting, secure mobility, and protection against threats that can arise during connection to computing resources, such as, communicating devices located outside the network 1. The security appliance 150 can include a firewall.

The $NA^3$ controller 160 can be configured to receive and process network user access privilege requests for one or more IT domains 10 (shown in FIG. 2), and to grant, renew, revoke or modify access privileges of network users to the IT domains 10.

In a non-limiting embodiment of the $NA^3$ controller 160, a web-service tool (e.g., web-service tool 260, shown in FIG. 5) can be configured to interact with the computing resource CR in the IT domain N (shown in FIG. 2), the Computing Resource Management system (CRM, shown in FIG. 1), administrator toolbox server (ATS, shown in FIG. 1) or the internal database server (DBS, shown in FIG. 1). The web-service tool can include the CRM system and ATS, or the CRM, ATS and DBS can be included in the file server 115, as noted earlier, or in a network inventory system (NIS) 245 (shown in FIG. 5). The NIS 245 (shown in FIG. 5) can include the ATS and DBS, and the CRM system can be included in the web-service tool.

The $NA^3$ controller 160 can include a fully automated database component that can trigger a task to the ATS and the CR (e.g., database server in the IT domain N, shown in FIG. 2) to add, revoke, renew or modify access privileges of network users relating to the IT domain N. Checks can be performed throughout a workflow process that can validate user inputs provided in the access request for the network user NU01 (shown in FIG. 2), and then send a triggering message to the ATS (e.g., shown in FIG. 1, or included in NIS 245, shown in FIG. 5) and the CR (e.g., database server in the IT domain N, shown in FIG. 2) to add the network user if validation passes. The $NA^3$ controller 160 can automatically configure and complete the network user provisioning without any human intervention. In this regard, the $NA^3$ controller 160 can be configured to depend on a database administrator generic (DBAG) account, and not an active directory.

Figure 5:
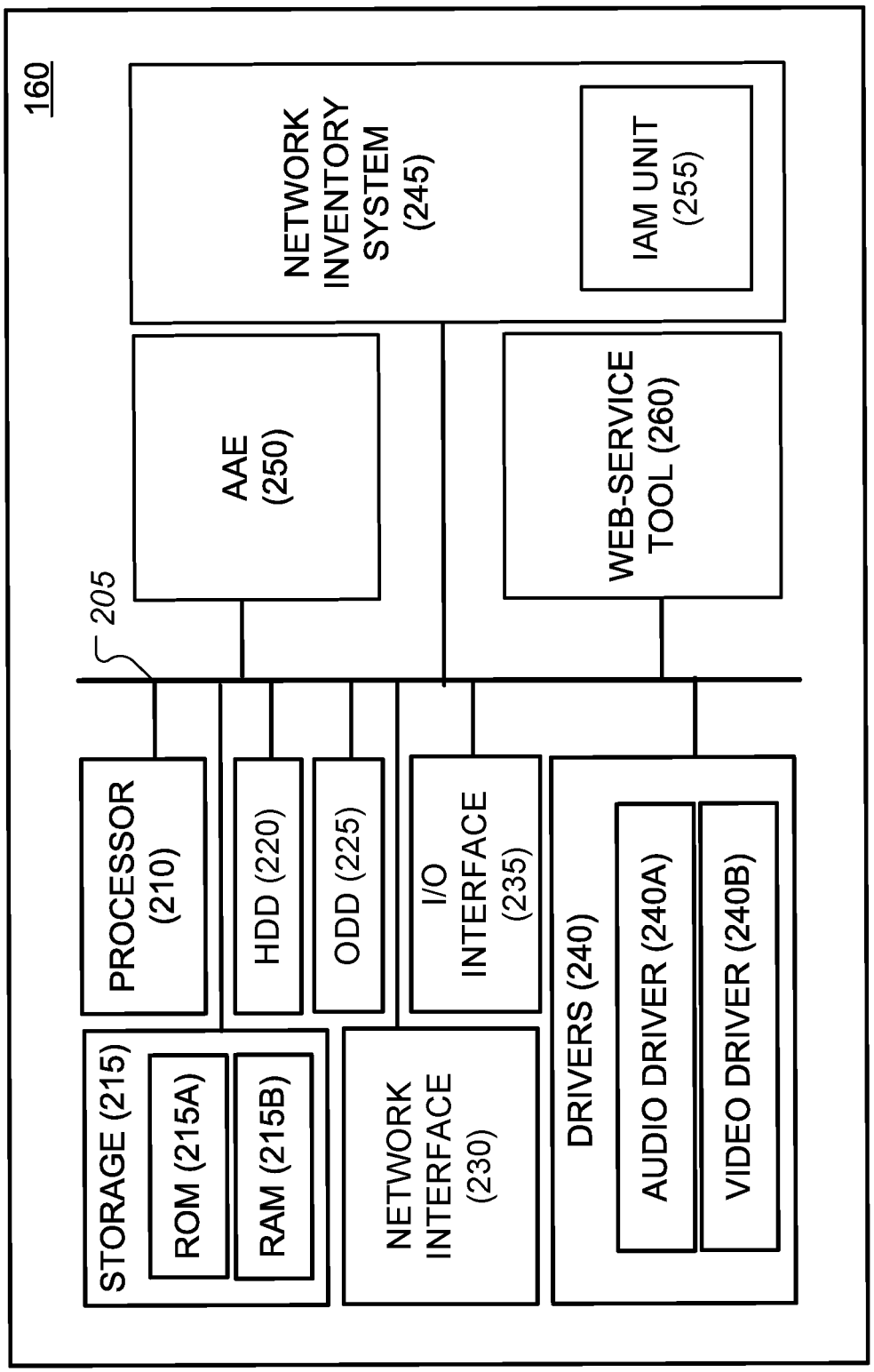
FIG. 5 shows an embodiment of a $NA^3$ controller in the $NA^3$ system in FIG. 4.

FIG. 5 shows a non-limiting embodiment of the $NA^3$ controller 160, constructed according to the principles of the disclosure. The $NA^3$ controller 160 can be configured to implement the various aspects of the disclosure. The $NA^3$ controller 160 can include a processor 210, a storage 215, a hard disk drive (HDD) 220, an optical disk drive (ODD) 225, a network interface 230, an input/output (I/O) interface 235, drivers 240, a network inventory system (NIS) 245, an automated approval application engine (AAE) 250, an identity and access management (IAM) unit 255, a web-service tool 260, and a bus 205, which can be communicatively linked to each of the computing resources 210 to 260 by a communication link. The IAM unit 255 can be included in the NIS 245. The NIS 245 can include the ATS, discussed above. Any one or more of the computing resources in the $NA^3$ controller 160 can include a device or a module that is separate from the processor 210, as seen in FIG. 5, or integrated with the processor 210.

The system bus 205 can include any of several types of bus structures that can further interconnect to a memory bus (with or without a memory controller), a peripheral bus, and a local bus using any of a variety of commercially available bus architectures.

The processor 210 can include any of various commercially available processors. Dual microprocessors and other multi-processor architectures can also be employed as the processor. The processor 210 can include a central processing unit (CPU) or a graphic processing unit (GPU).

The $NA^3$ controller 160 can include a computer-readable medium that can hold executable or interpretable computer code (or instructions) that, when executed by the processor 210 or one or more of the computing resources 245 to 260, causes the steps, processes and methods in this disclosure to be carried out. One or more of the computing resources 245 to 260 can include application program interfaces (APIs). The computer-readable medium can be contained in the storage 215, HDD 220, or ODD 225. The computer readable medium can include sections of computer code that, when executed cause the $NA^3$ controller 160 to carry out: a system configuration process (shown in FIG. 6); an automated network identity and access management process (shown in FIGS. 7 and 8); generating an access request graphic user interface that includes data fields that can be included in an access request (shown in FIG. 9); generating an access request record that can be populated with data from an access request (shown in FIG. 10), a validation table having valuation criteria that can define permissible criteria for automatically granting, renewing, modifying or revoking access privileges to an IT domain in the network (shown in FIGS. 11A to 11C); a workflow process (shown in FIG. 12); an implementation of the workflow process (show in FIG. 13); or other process steps described or contemplated in this disclosure.

The storage 215 can include a read only memory (ROM) 215A and a random-access memory (RAM) 215B. A basic input/output system (BIOS) can be stored in the non-volatile memory 215A, which can include, for example, a ROM, an EPROM, an EEPROM, or the like. The BIOS can contain the basic routines that help to transfer information between components within the $NA^3$ controller 160, such as during start-up. The RAM 215B can include a high-speed RAM such as static RAM for caching data.

The HDD 220 can include, for example, an enhanced integrated drive electronics (EIDE) drive, a serial advanced technology attachments (SATA) drive, or any other hard drive device, The ODD 225 can read/write from/to a CD-ROM disk (not shown), or, read from or write to other high capacity optical media such as the DVD. The HDD 220 can be configured for external use in a suitable chassis (not shown). The HDD 220 and ODD 225 can be connected to the system bus 205 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The HDD 220 or ODD 225, and their associated computer-readable media, can provide nonvolatile storage of data, data structures, or computer-executable instructions. The HDD 220 or ODD 225 can accommodate the storage of any data in a suitable digital format. The storage 215, HDD 220, or ODD 225 can include one or more apps that can be used to execute aspects of the architecture in this disclosure.

A number of computer programs or computer program modules can be stored in the storage 215, HDD 220, or ODD 225, including an operating system (not shown), a web API, a simple object access protocol (SOAP) API, a remote procedure call (RPC) API, a representation state transfer (REST) API, other utilities or services APIs, and program data (not shown). Any (or all) of the operating system, application programs, program modules, and program data can be cached in the RAM 215B as executable sections of computer code.

The network interface 230 can be connected to nodes in the computer network 1 or nodes outside the network 1. The network interface 230 can include a wired or a wireless communication network interface (not shown) or a modem (not shown). When used in a local area network (LAN), the $NA^3$ controller 160 can be connected to the LAN network through the wired or wireless communication network interface; and, when used in a wide area network (WAN), the $NA^3$ controller 160 can be connected to the WAN network through the modem. The modem can include one or more modems (not shown) configured for one or more network standards for transmission or reception of communication signals within the network 1 or via the Internet, PSTN, PLMN or any other network. The network 1 (shown in FIG. 2) can include a LAN, a WAN, or any other network. The modem (not shown) can be internal or external and wired or wireless. The modem can be connected to the system bus 205 via, for example, a serial port interface (not shown).

The (I/O) interface 235 can receive commands and data from an operator, which can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from or to the I/O interface 235 as instruction or data signals. The instruction and data signals can be transmitted between the I/O interface 235 and any of the computing resources in the $NA^3$ controller 160 via communication links and the bus 205.

The drivers 240 can include an audio driver 240A and a video driver 240B. The audio driver 240A can include a sound card, a sound driver (not shown), an interactive voice response (IVR) unit, or any other device necessary to render a sound signal on a sound production device (not shown), such as for example, a speaker (not shown). The video driver 240B can include a video card (not shown), a graphics driver (not shown), a video adaptor (not shown), or any other device necessary to render an image signal on a display device (not shown).

The NIS 245 can be responsible for the central storage and management of data files, network user records, IT domain access privilege records, network logs, historical data, and any other instruction or data files needed by the $NA^3$ controller 160. The NIS 245 can include a network inventory server (not shown) or a database server (not shown). The NIS 245 can include the IAM unit 255. The NIS 245 can include data, which can be stored as data records or files, that can be accessed by the computing resources in the $NA^3$ controller 160. The NIS 245 can include a plurality of databases, including, for example, two or more relational databases.

The NIS 245 can store and manage directory service information, including a centralized directory of all network users and IT domains 10 in the network 1. The NIS 245 can store and manage, for example, information about network users and computing resources such as, for example, systems, networks, services, and applications throughout the network 1. The NIS 245 can store and manage a central directory that can include for each network user an employee job title, user roles or responsibilities, an employee number, a social security number, a link to a database record, a business unit identifier, a supervisor identifier, a subordinate identifier, a location, access privileges, privilege levels, identification of computing resources or IT domains that can be accessed and associated privileges, or any other identifier that can accurately identify each network user and their access privileges in the network 1. The NIS 245 can include data necessary to generate route lists for workflow processes that include routing access requests through the appropriate nodes in the network 1 to grant, revoke, renew or modify access to one or more computing resources by network users.

The NIS 245 can store and provide an organized set of records, including records with a hierarchical structure, such as, for example, an email directory, a phone directory, and a computer resource directory. The NIS 245 can be implemented with, for example, a lightweight directory access protocol (LDAP) for accessing and maintaining distributed directory information services over.

The data stored in the NIS 245 can be mirrored in a portion of the file server 115 (shown in FIG. 4), or a portion of the file server 115 can be operated in place of the NIS 245. The NIS 245 can be omitted, in which case the file server 115 can be configured to carry out all of the storage and operational functionalities performed by the NIS 245.

The AAE 250 can include a configurable approval framework for creating, modifying, removing, running or managing approval processes in the network 1, including creating, modifying, renewing or terminating workflow routing lists. The AAE 250 can include an approval workflow framework that can support many computing resources and can define and route requests and information between nodes in the network 1. The AAE 250 can create workflow route lists that include each node hop through which the workflow process must progress to completion. The workflow route list can include an NLID for each node hop in the list.

The AAE 250 can communicate with the NIS 245, as well as, for example, human resource or organizational systems (not shown) in the network 1. The AAE 250 can create, modify, or delete approval workflow route lists for nodes in the network 1 based on, for example, workflow schemas, network policies or rules, relevant authorities described in network policies, role-based access control policies or rules, business processes, or business process policies. The AAE 250 can be integrated with computing resources and handle approval processes in the network 1 in standardized or streamlined fashion. Workflows can be triggered outside the AAE 250, such as, for example, at the web-service tool 260, and processed by the AAE 250 to route requests through appropriate nodes in the network 1, such as, for example, routing network user access requests for one or more IT domains 10 through the appropriate nodes in the network 1, as discussed in detail below.

The AAE 250 can set up or facilitate the setting up of controls such as, for example, escalation procedures, whether a workflow process permits delegation of authority or other controls. The AAE 250 can generate or can communicate with other computing resources, such as, for example, the web-service tool 260, to facilitate generation of graphic user interfaces (GUIs), or population of GUIs with data that can be displayed by the communicating devices 20 (shown in FIG. 2). The AAE 250 can create, configure, define, modify, or implement, or can work in cooperation with other computing resources in the $NA^3$ controller 160 to create, configure, define, modify, or implement workflow route lists for each workflow process relating to network user requests for changes to their access privileges for one or more IT domains 10 in the network 1.

The IAM unit 255 can include a framework that can facilitate management of electronic or digital identities for each network user in the network 1. The framework can define how network users and their roles are identified in the computer network 1. The framework can add, remove, or update network users and their roles in, for example, an enterprise system that includes the network 1. The IAM unit 255 can protect sensitive data and secure the network 1 through timely, accurate and comprehensive control and management of network user identities and access to the computing resources in the network 1.

The IAM unit 255 can include all the necessary controls and tools to capture and record network user login information, manage the database of network user identities and support the assignment, modification, renewal or removal of access privileges. The IAM unit 255 can provide a centralized directory functionality with oversight and visibility into all aspects of the network user base for the network 1. The IAM unit 255 can interact with the computing resources in the $NA^3$ controller 160 to reduce the time it can take to complete network user provisioning, account setup, account updating, or account removal processes with controlled workflows that can decrease errors and any potential for abuse while allowing automated account fulfillment. The IAM unit 255 can facilitate real-time visibility into, and changes to access rights of network users to specific computing resources in the network 1.

The IAM unit 255 can include a central directory or access the central directly located in the NIS 245 to automatically match, for example, employee job titles, business unit identifiers and locations to their relevant privilege levels. Multiple review levels can be included as workflows to enable the proper checking of individual network user requests. This can simplify setting up appropriate review processes for higher-level access as well as easing reviews of existing rights to prevent privilege creep, such as, for example, a gradual accumulation of access rights beyond what a network user might need to do his or her job.

The IAM unit 255 can include a user grouping functionality to provide for creation, management and control of network user groups with specific privileges for specific roles so that access rights based on employee job functions can be uniformly assigned. The IAM unit 255 can include request and approval processes for modifying privileges where network users with the same title and job location need customized or different access rights. The IAM unit 255 can be configured to initiate, capture, record and manage all network user identities and their related access permissions in an automated manner.

The web-service tool 260 can include a web-service interface that can interact with network users via one or more communicating devices 20 (shown in FIG. 2). Communication between the communicating device(s) 20 and web-service tool 260 can be carried out via, for example, the network interface 230 and one or more communication links. The web-service tool 260 can receive a request from the communicating device 20 for access privileges to the IT domain N by the network user NU01, or a request for modification or renewal of assigned access privileges of the network user NU01 for the IT domain N, such as, where the network user NU01 has "Read-Only" privileges to the IT domain N but also needs "Write" privileges to perform their job.

The web-service tool 260 can interact with the computing resource CR (e.g., database server) in the IT domain N (shown in FIG. 2), the NIS 245 or the AAE 250. The web-service tool 260 can reference, or it can trigger the referencing of a validation criteria in a validation table 404VT (for example, shown in FIGS. 11A to 11C) and verify an access request for the network user NU01 requesting access privileges to the IT domain N (shown in FIG. 2). The validation table 404VT can be created or updated based on instructions or data received from the communicating device 20 of the network user NU02 who has sufficient privileges to create, modify, renew and revoke network user accounts or access privileges for the IT domain N (shown in FIG. 2). The validation table 404 VT can include a plurality of valuation criteria, which can include criteria in general data fields (for example, Step Number, Field (Attribute), description, Type, Value Selection, Default, Validate (ON), Dependency, Required, Read Only, shown in FIG. 11A) that can be populated with data received from the communicating device 20 of the network user NU02 (shown in FIG. 2).

The web-service tool 260 can analyze the data in an access request against the validation table 404VT and send a triggering message to the NIS 245, AAE 250, or the IT domain 10 (for example, database server in IT domain N) to grant, renew, modify or revoke access privileges based on the data provided in the access request for the particular network user NU01 (shown in FIG. 2).

Figure 6:
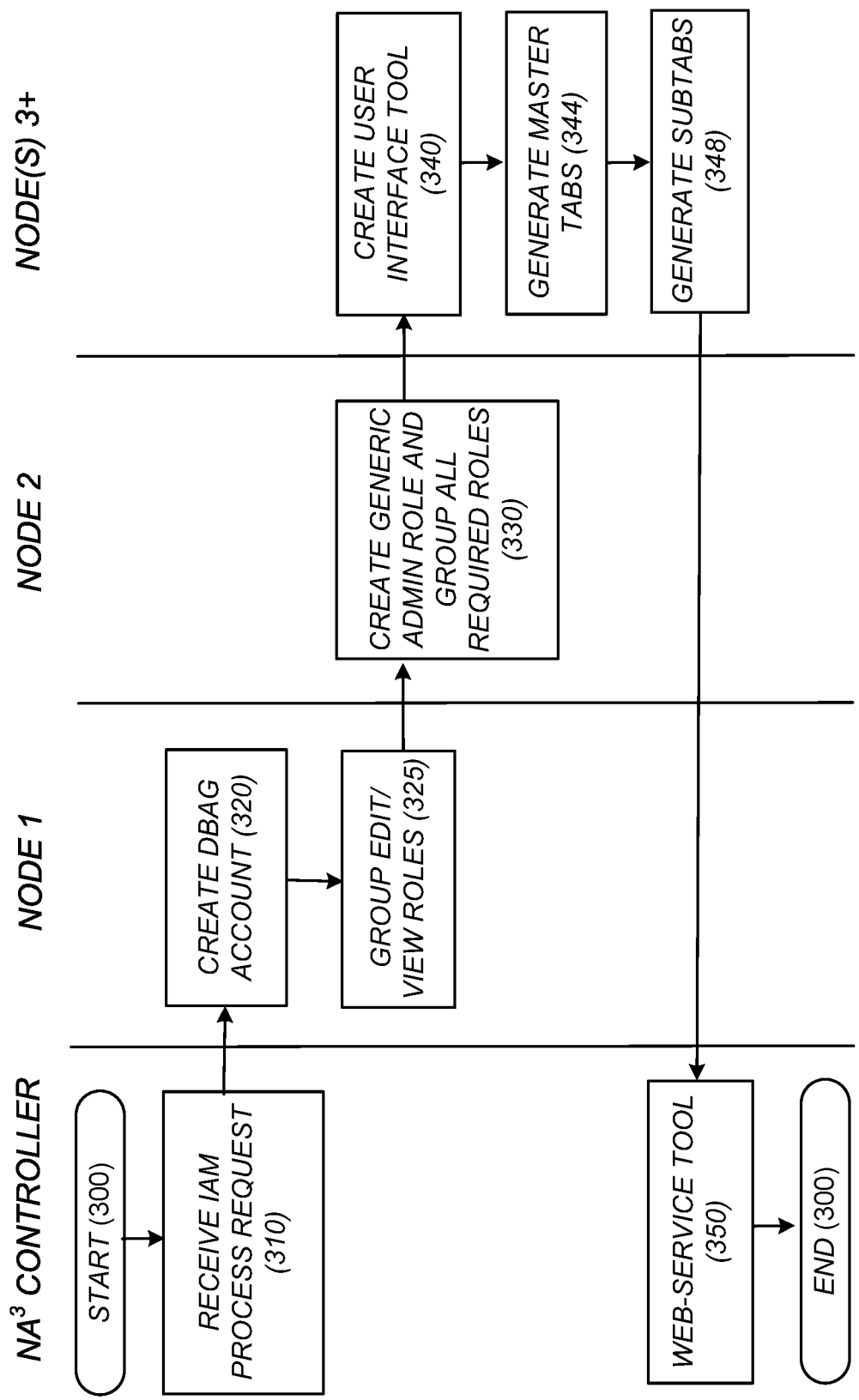
FIG. 6 shows a non-limiting embodiment of a system configuration process.

FIG. 6 shows a non-limiting example of a system configuration process 300, according to the principles of the disclosure. The process 300 can be initiated in the network 1 to setup automated network user provisioning in the network 1. The process can start when the $NA^3$ controller 160 (shown in FIG. 4) receives a request for an automated network identity and access management (AIAM) process (Step 310). The AIAM process request can be received by the $NA^3$ controller 160 from, for example, the ACD 25 (shown in FIG. 1) or the communicating device 20 (shown in FIG. 2) that is operated by, for example, a network administrator (network user US02) who is tasked with managing network user account or access privileges to IT domains 10 (shown in FIGS. 1 and 2). The $NA^3$ controller 160 can generate a workflow route list (e.g., via the AAE 250, shown in FIG. 5) based on the AIAM process request from the network user NU02 and the IT infrastructure inventory data in the NIS 245. The workflow route list can include each of the nodes (e.g., NODE 1, NODE 2, NODE 3) that need to be included in the workflow process for completion of the AIAM process.

Based on the workflow route list, a request can be sent to the first node (or hop) in the route list, NODE 1, from, for example, the $NA^3$ controller 160, to initiate creation of a database administrator generic (DBAG) account (Step 320). In this non-limiting example, NODE 1 corresponds to the computing resource CR (e.g., database server) included in the IT domain N (shown in FIG. 2). The request can include an instruction to the NODE 1 to create the DBAG account without an expiration date or password reset, so that the DBAG account can be used by the $NA^3$ controller 160 to grant, modify, renew or revoke access privileges of network users to the IT domain N without any human intervention. The computing resource CR can be operated by, for example, an application database administrator for the IT domain N. Upon receiving the request, the IT domain N (at NODE 1) can assign an account identification (AID) and a database identification (DBID) for the DBAG account (Step 320). After assigning the AID and DBID for the DBAG account, edit roles can be grouped or determined that will be required to obtain edit privileges (Step 325). Similarly, view roles can be grouped or determined that will be required to obtain view (or, in certain instances, edit) privileges (Step 325).

The workflow process can proceed to the next node hop in the workflow route list, the communicating device at NODE 2. NODE 2 can include, for example, a network database management system for the network 1. The network database management system can be located, for example in the file server 115 (shown in FIG. 4), the NIS 245 (shown in FIG. 5), or a communicating device 20 (shown in FIG. 2).

At NODE 2, a generic admin role (e.g., an ORACLE® generic administrator role) and all required roles (e.g., edit, view) to be used by, for example, the network user NU02 (shown in FIG. 2) can be developed (Step 330). The roles to be used can include the required roles to grant, revoke, new, modify or check the creation status of network user accounts or access privileges. After completion of Step 330, the workflow process can proceed to the next node hop in the workflow route list, the communicating device at NODE 3. NODE 3 can include a communicating device 20, for example, located at an application developer site.

The workflow route list can include as next node hops a plurality of communicating devices 20 located at corresponding NODES 3+ and that are operated by respective application developers, so as to allow for parallel development of computing resources.

At NODE(S) 3+, a user interface can be created or updated (Step 340). In a non-limiting embodiment, a user interface can be created and installed in the web-services tool 260 (shown in FIG. 5), or an existing user interface in the web-services tool 260 can be updated. The user interface can include a User Access Manager (UAM) interface to manage user access authentication and authorizations. The UAM interface can include one or UAM master tabs, such as, for example, a user tab, an area code tab, and a regions tab. The UAM master tab(s) can be included in the UAM interface as one or more selectable fields in a graphic user interface (GUI), or as unique display screens with data fields.

The UAM master tabs can be created or updated at NODE(S) 3+ and included in the user interface (Step 344). The UAM master tab can be included in a GUI that can be reproduceable on the communicating device 20 at the network user NU02 location (shown in FIG. 2).

One or more UAM subtabs can be created (or updated) and included in the UAM interface (Step 346). The UAM subtabs can include subtabs in the user tab, such as, for example, "Grant Edit Roles," "Grant View Roles," "View & Modify User Prosperities," "Revoke Roles," "Renew Edit Roles," "Renew View Roles," or "Export User Reports." Each UAM subtab can include a unique (GUI), or it can be included as one or more selectable fields in the UAM master tab.

The area code tab can include a list of all area codes, zone numbers, or other location-specific identifiers that can define one or more specific locations for which the UAM interface can manage user access authentications or authorizations. The regions tab can include a list of all geographic (or virtual) regions for which the UAM interface can manage user access authentications or authorizations. A geographic (or virtual) region can include one or more groupings of area codes, zone numbers or other location-specific identifiers.

Figure 7:
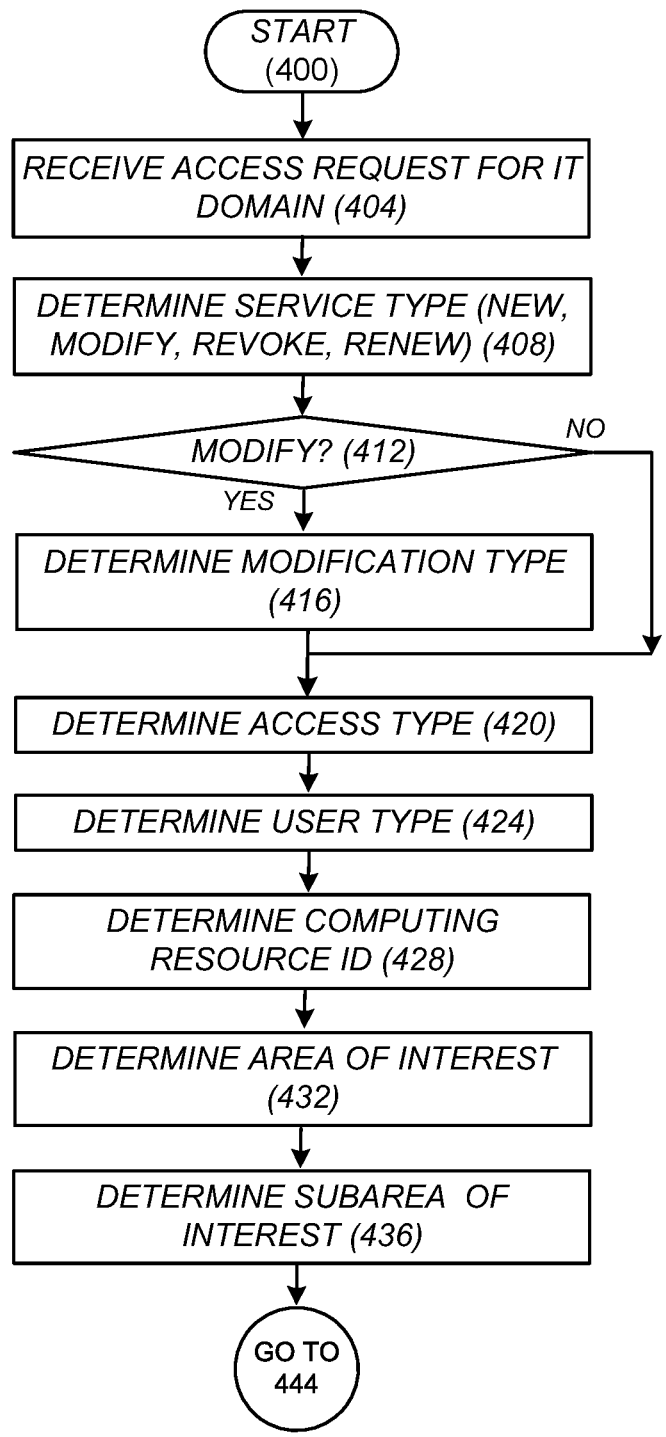
FIGS. 7 and 8 show an embodiment of an automated network identity and access management process.
Figure 8:
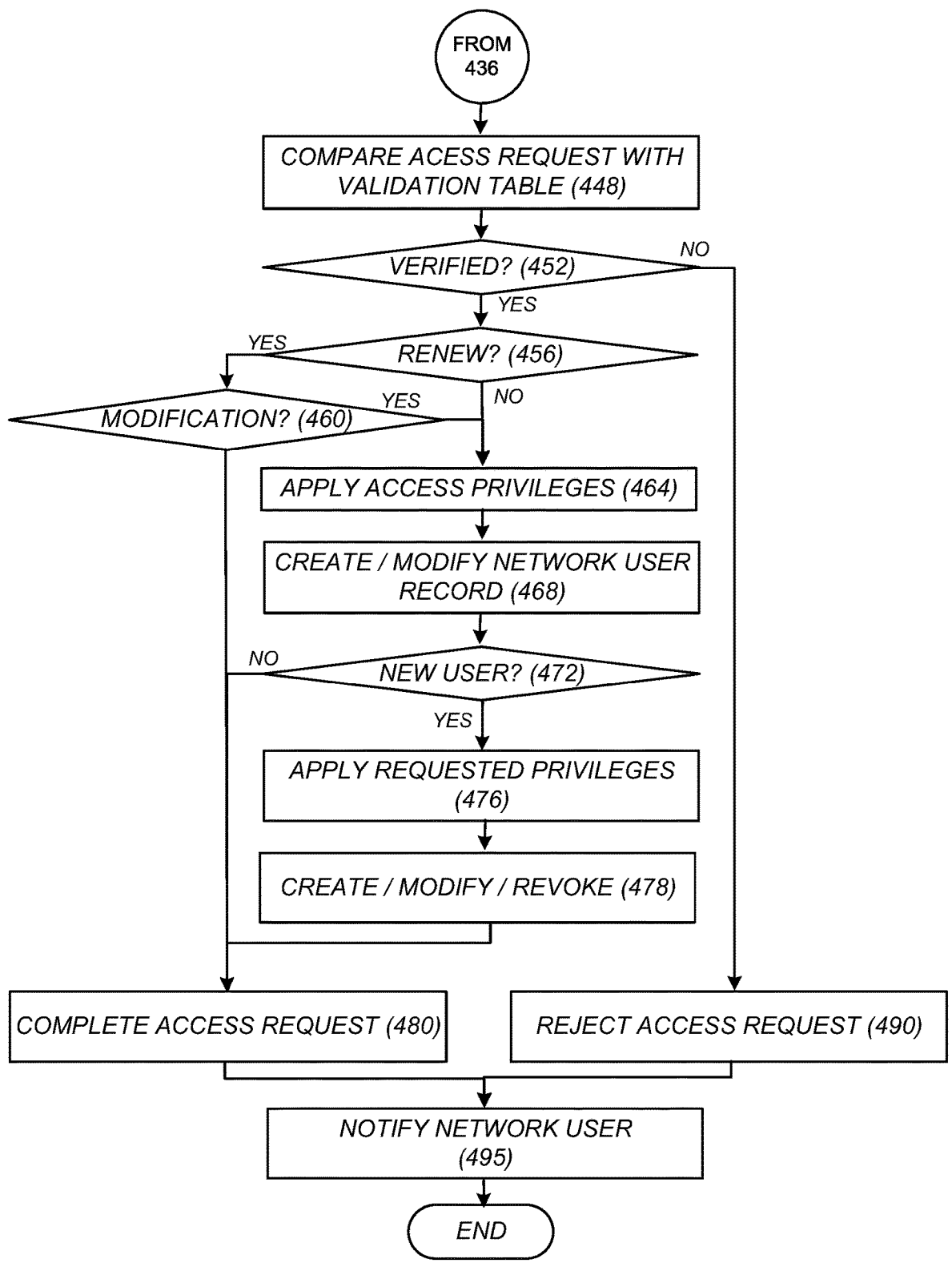

FIGS. 7 and 8 show a non-limiting embodiment of an automated network identity and access management (AIAM) process 400, according to principles of the disclosure. Referring to FIGS. 2, 7 and 8, the process 400 can start when the $NA^3$ system 30 receives an access request relating to access privileges of the network user NU01 (Step 404). The access request can include a request to grant, renew, modify or revoke access privileges of the network NU01 to the IT domain N. FIG. 9 shows an example of an access request graphic user interface (GUI) 404AR that includes fields that can be included in the access request. The GUI 404AR can be rendered on a communicating device 20 and populated with instructions or data received from a network user, or the GUI 404AR can be auto-populated based on network user account data for the network user NU01, which can be maintained in the NIS 245 (shown in FIG. 5).

The GUI 404AR can include a plurality of data fields to capture the data needed in the access request, including general data fields such as, for example, entry of the name of the network user NU01 ("Requested For"), the network user's organization ("Organization"), the requester's name ("Requester"), and the point of contact ("Site Contact"). The GUI 404AR data fields can include a justification field ("Justification") and an additional information field ("Additional Information") for entry of additional information that might be helpful in determining whether to approve or reject the access request. The GUI 404AR data fields can include service detail fields, such as, for example, a service type ("Service Type"), name or identification of IT domain N ("Production Database Granted"), type of network user ("User Type"), identification of the communicating device 20 that will access the IT domain N ("Computer/Laptop Physical ID"), areas of interest (e.g. "ISP," "OSP"), and geographic area of interest (e.g., "All," "Central Area," "East Region 1," "West Region 2," "South Region 3," "North Region 4").

The received access request data can be parsed and a determination made based on the service type identification data in the service type field whether the access request is for new access privileges (New), or modification of existing access privileges (Modify), or revocation of existing access privileges (Revoke), or renewal of existing access privileges (Renew) (Step 408). If it is determined that the access request is for modification of existing access privileges (YES at Step 412), then the access request data can be analyzed to determine the modification type (Step 416), otherwise the access type can be determined from the access request (NO at Step 412, then Step 420).

In Step 416, the parsed data can be analyzed to determine whether the modification type is, for example, "View to Edit," "View to Admin," "Edit to View," "Edit to Admin," "Admin to View," or "Admin to Edit." The modification type "View to Edit" can be determined as an instruction to change the access privilege of the network user NU01 from "View" to "Edit," so that the network user NU01 can be permitted to write to or edit data in the IT domain N, as opposed to the existing access privilege "View," which can be a "Read Only" setting. The "View to Admin" modification type can be determined as an instruction to change NU01's access privilege from, for example, "Read Only" to full administrator privileges. The other modification types can be similarly determined as instructions to modify the network user's access privileges from the current setting to the indicated setting.

In Step 420, the parsed data can be analyzed to determine whether access type is, for example, View, Edit, or Admin. The access types "View," "Edit," and "Admin" can dictate that, with respect to the IT domain N indicated in the access request, the network user NU01 have read only privileges, read and write and edit privileges, and full administrator privileges, respectively.

The access request data can be further analyzed to determine the network user type (Step 424), computing resource identification (Step 428), area of interest (Step 432) and subarea of interest (Step 436). Referring to the GUI 404AR (shown in FIG. 9), the network user type data can identify, for example, whether the network user NU01 is an employee, contractor, or part-time employee (Step 424); the computing resource identification data can include, for example, NLID of the communication device 20 used by the network user NU01 (Step 428); the area of interest data can indicate the geographical area to which the access privileges relate, including, for example, all regions, a central area, an eastern region 1, a western region 2, a southern region 3, or a northern region 4 (Step 432); and the subarea of interest can indicate, with respect to the geographic area of interest, whether the access privileges relate to, for example, inside a manufacturing plant (ISP) or outside the plant (OSP) (Step 436).

The access request data can be compared against the valuation criteria in the validation table 404VT (shown in FIGS. 11A to 11C) (Step 448). The comparison can be made by, for example, the web-service tool 260 (shown in FIG. 5), or a trigger signal can be sent to the computing resource CR in the IT domain N to perform the comparison (Step 448). In the latter instance, the access request data can be sent to the IT domain N (shown in FIG. 2) to compare against the validation criteria in the validation table 404VT. In the former instance, the validation table 404VT (validation criteria) can be retrieved by or sent to the web-service tool 260 from the IT domain N, if not already included in the web-service tool 260.

Based on the results of the comparison, a determination can be made whether the data in the access request is verified (Step 452). If it is determined that the access request is not consistent with the validation table 404VT (NO at Step 452), then the access request can be rejected (Step 490) and a message can be sent to the network user NU01 (Step 495).

If the data in the access request is verified (YES at Step 452), then the service type of the access request can be referenced (Step 456) and if the access request is for renewal of access privileges (YES at Step 456), then a determination can be made whether access privileges need to be modified (Step 460), and if not (NO at Step 460), then the access request privileges can be renewed (Step 480).

If, however, the access request is for new or modified access privileges, or to revoke existing access privileges for the network user NU01 (NO at Step 456), then the requested access privileges (or revocation) can be applied (for example, by CR in the IT domain N, shown in FIG. 2) (Step 476) and a network user record can be created or modified to capture the changes (for example, in the NIS 245, shown in FIG. 5) (Step 478). In Step 478, for a Modify service type, the user record relating to authorization and authentication for the IT domain N can be modified to include the access privileges provided in the access request; for a Renew service type, the user record can be updated to include the new time period during which the network user NU01 can access the IT domain N, according to existing or updated access privileges; for a Revoke service type, the user record can be updated to indicate that all access privileges for the IT domain N are revoked; and, for a New User service type, the user record can be updated to include access privileges to the IT domain N, including, for example, granting of Edit, View, or Admin privileges, based on the access request data.

After it is determined that the access request process has completed (Step 480), a notification can be sent to the network user NU01 regarding the access privileges for the IT domain N (Step 495).

According to an embodiment of the disclosure, the Steps 404 to 436 and 480 to 495 can be carried out by, for example, the web-service tool 260 (shown in FIG. 5); Steps 448 to 476 can be carried out by, for example, the CR in the IT domain N (shown in FIG. 2); and Step 478 can be carried out by, for example, the NIS 245 (shown in FIG. 5).

Figure 12:
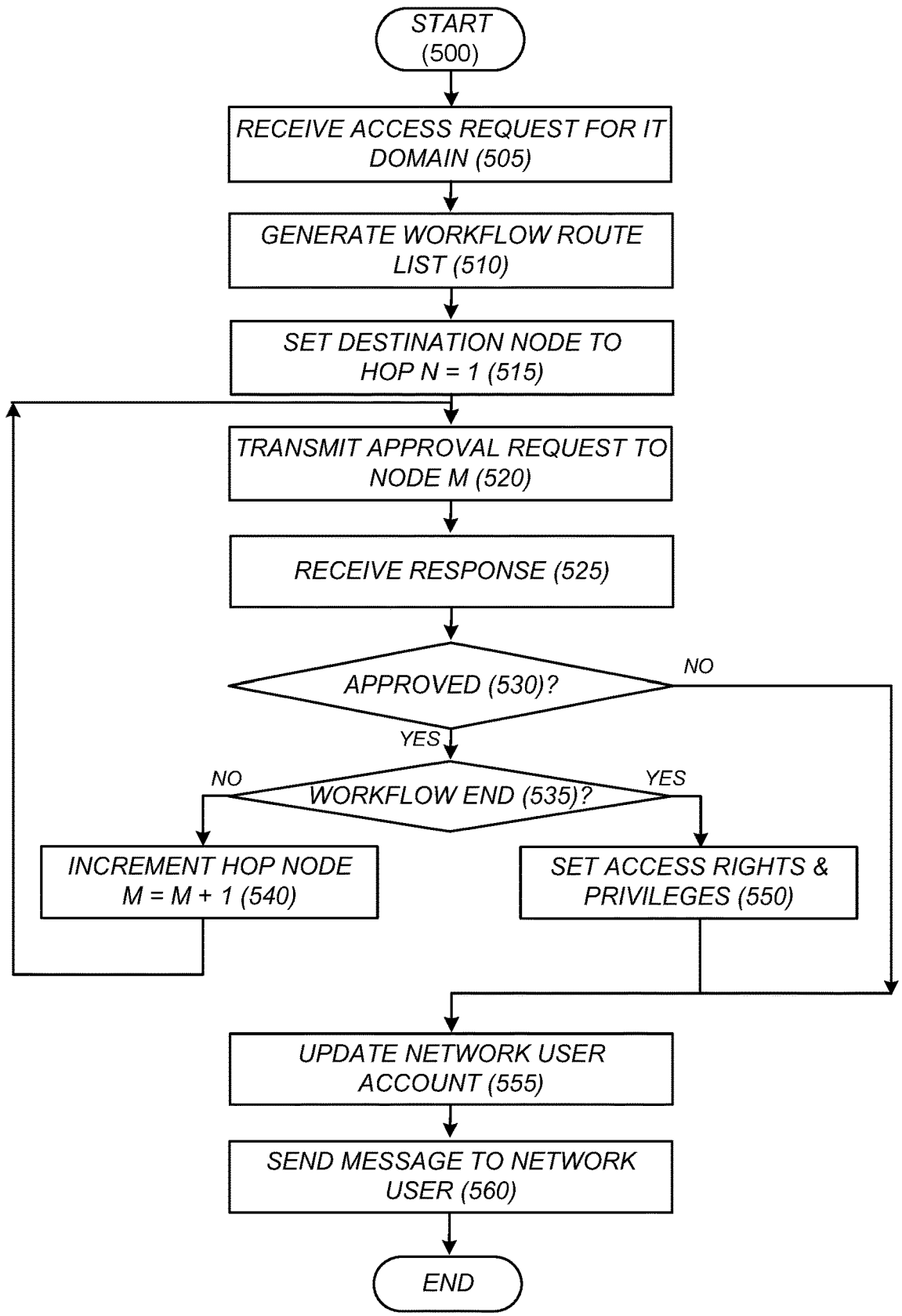
FIG. 12 shows an embodiment of a workflow process.

FIG. 12 shows a non-limiting embodiment of a workflow process 500, according to the principles of the disclosure. The process 500 can start when the NA$^3$ controller 160 (shown in FIG. 4) receives a request for access to the IT domain N (shown in FIG. 2) by the network user NU01 (Step 505). The access request can be generated in response a service request (e.g., GUI 404AR, shown in FIG. 9) being completed at a communicating device 20 (shown in FIG. 2) and transmitted to the NA$^3$ controller 160 (shown in FIG. 4).

Based on the data provided in the access request (e.g., GUI 404AR, shown in FIG. 9), the AAE 250 can be triggered and the NIS 245 can be referenced for related IT infrastructure data (including network user base data) to generate a workflow route list (Step 510). In this regard, the validation criteria in the validation table 404VT (shown in FIGS. 11A to 11C) can be referenced to validate the data in the access request. The workflow route list can be generated by the AAE 250 and include as hops all nodes necessary for completion of the workflow process. The first node M in the workflow route list can be identified (Step 515) and the approval request can be transmitted to the communicating device 20 at the node M (Step 520). A response (e.g., "Approve," or "Reject") can be received from the node M (Step 425). Based on the received response, a determination can be made whether the access request was approved at the node M (Step 530).

If it is determined that the access request was approved (YES at Step 530), then a determination can be made whether an end of the workflow process has occurred (Step 535). If, however, it is determined that the access request was rejected (NO at Step 530), then the access request rejection and related details can be logged and the network user record updated (e.g., in the NIS 245, shown in FIG. 5)

(Step 555) and a message sent to the network user, including information regarding rejection of the access request (Step 560).

If it is determined that the end of the workflow process has occurred (YES at Step 535), then the requested access rights and privileges for the particular network user can be set for the particular IT domain N (shown in FIG. 2) (Step 550). In this regard, a trigger can be sent by the web-service tool 260 (shown in FIG. 5) to the NIS 245 (shown in FIG. 5) and the CR in the IT domain N (shown in FIG. 2) to grant, revoke, or modify privileges for the particular network user NU01 based on the information in the access request. The access request approval and related details can be logged and the network user record updated (e.g., in the NIS 245, shown in FIG. 5 and in the IT domain N, shown in FIG. 2) (Step 555), including the new access privileges for the IT domain N. A message can be generated and sent to the network user, including information regarding access request grant and new access privileges for the IT domain N (Step 560).

If, however, it is determined that the end of the workflow process has not occurred (NO at Step 535), then the workflow process can proceed to the next hop in the workflow route list (Step 540) and transmit the approval request to the next node M=M+1 (Step 520). Steps 520 to 540 can be repeated until the end of the workflow is reached (YES at Step 535). At the conclusion (YES at Step 535), the access privileges for the particular network user NU01 can be set for the particular IT domain N (shown in FIG. 2) (Step 550).

FIG. 10 shows an example of an access request record 404ARUR that can be populated with the data from the access request, as well as additional data that was determined or generated during the workflow process as it progressed through the workflow route list. All access request approvals and related details can be logged and the network user record updated (e.g., in the NIS 245, shown in FIG. 5 and in the IT domain N, shown in FIG. 2) (Step 555), and a message sent to the network user (Step 560). The data in the access record 404ARUR can be stored in the NIS 245. The access record 404ARUR data can be stored in the network user record or stored separately and linked to the network user record via, for example, a pointer.

Referring to FIG. 10, the access privilege settings in the access request record 404ARUR can include the information that was included in the original access request (e.g., 404AR, shown in FIG. 9). The access request record 404ARUR can further include information added at various nodes in the workflow process, such as, for example, the log data (see "Log: Note" in "NOTES" section) and approval details (see "AUTO APPROVAL" section).

Figure 13:
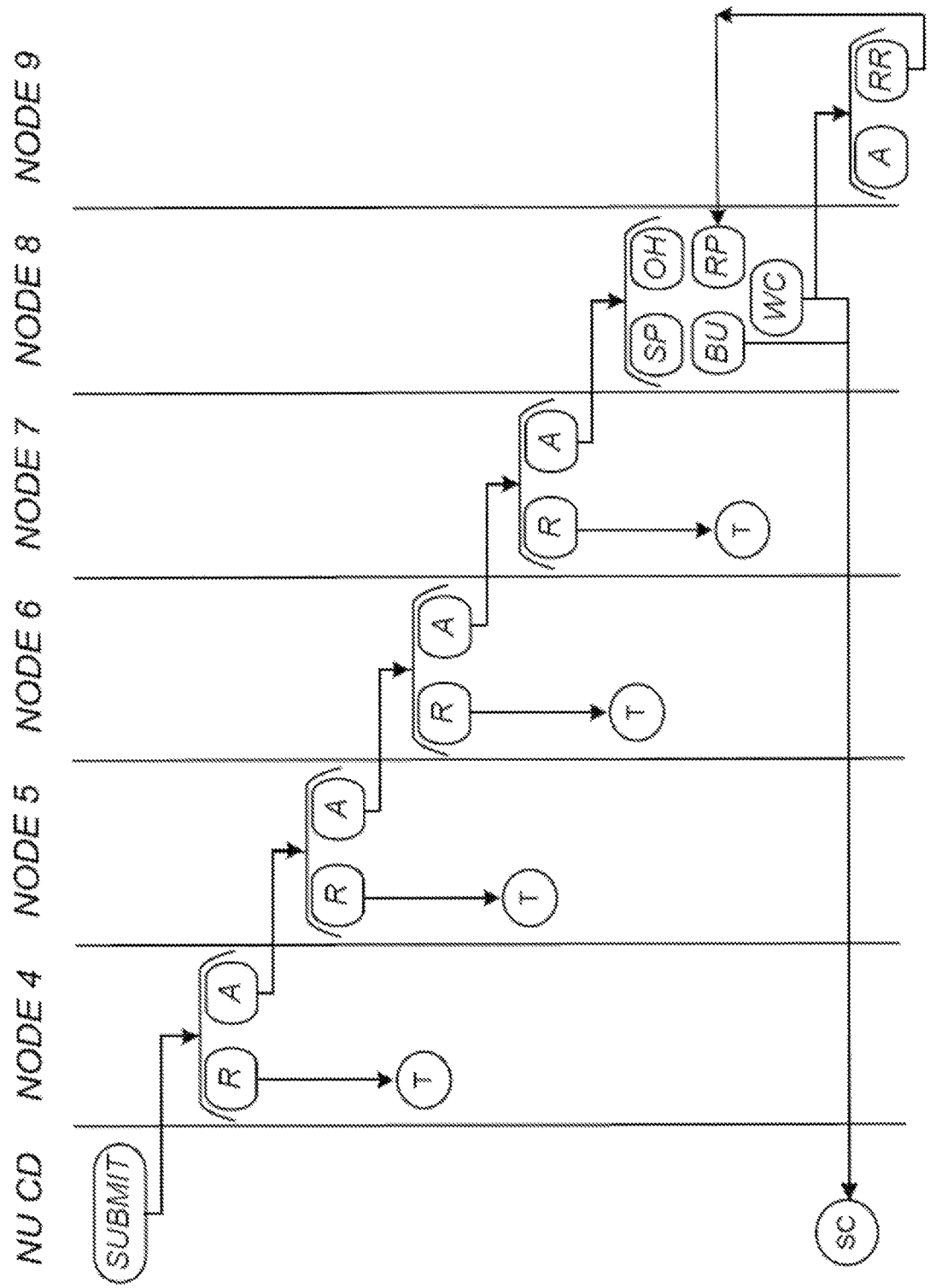
FIG. 13 shows a flow diagram of an implementation of the workflow process in FIG. 12.

FIG. 13 shows a flow diagram of an example of a workflow process for granting access privileges to a network user NU01 for the IT domain N (shown in FIG. 2). According to the process 500 (shown in FIG. 12), the workflow process can begin upon submission of an access request for the network user NU01 at a communicating device NU CD (e.g., a communicating device 20, shown in FIG. 2). Based on the workflow route list generated by, for example, AAE 250 (shown in FIG. 5), the access request can be progressed according to the workflow process through each of NODES 4 to 9, which can include, for example, a Division Head (NODE 4), a Unit Head for Department 1 (NODE 5), a Unit Head for Department 2 (NODE 6), a Group Head (NODE 7), a Processor, Contractor or Dispatcher (NODE 8), and a Delegee of the Division Head (NODE 9). At each of NODES 4 to 7, an approval ("A") or rejection ("R") can be selected by, for example, selecting an associated radio button on the communicating device at the node. Each time the access request is accepted at a node, the workflow process proceeds to the next hop in the workflow route list. However, if the access request is rejected (R) at any node, then the workflow process is terminated ("T").

After the necessary approvals in the workflow process are entered (e.g., NODES 4 to 7), the workflow process can proceed to the implementation/dispatching step in the workflow process (e.g., NODE 8). At this step, any of a plurality of selections can be made at the node, for example, start processing ("SP"), on-hold ("OH"), resume processing ("RP"), back to user ("BU") or work completed ("WC"). The SP selection can include an instruction to carry out the access privilege provisioning for the network user (NU) until completion (WC). Once the access privileges are set for the network user, a message ("SC") can be sent to the network user communication device (NU CD), which can include, for example, a customer survey. Upon completion, the workflow process can progress to final stage in the process, NODE 9, where an instruction can be input to close the workflow process ("A") or reopen the request ("RR"), in which case the workflow process can return to previous hop, NODE 8, so that processing can resume ("RP").

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a satellite phone, a personal data assistant (PDA), a smart watch, a tablet, a computer, a software defined radio (SDR), a software defined transmitter or a software defined receiver. The communicating device can be portable or stationary.

The term "communication link," as used in this disclosure, means a wired or wireless medium that can convey data or information between at least two points. The wired or wireless medium can include, for example, a metallic conductor link, a radio frequency (RF) communication link, an Infrared (IR) communication link, an optical communication link, or a radiant energy link. The RF communication link can include, for example, WiFi, WiMAX, IEEE 802.11, DECT, 0G, 1G, 2G, 3G, 4G or 5G cellular standards, or Bluetooth.

The terms "computer" or "computing device," as used in this disclosure, means any machine, device, circuit, component, or module, or any system of machines, devices, circuits, components, or modules that are capable of manipulating data according to one or more instructions, such as, for example, without limitation, a processor, a microprocessor, a central processing unit, a graphic processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means a computing device, a communicating device, a communication link, software, a software application, a web application, a web page, a computer application, an application programming interface (API), a computer program, computer code, machine executable instructions, a storage device, firmware, or hardware. A computing resource can include any hardware, software, firmware or device that has or can be configured to have an Internet Protocol (IP) address, including, for example, a router, a switch, a server, a printer, a scanner, a camera, or an Internet-of-Things (IoT) device.

The term "computer readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The computer-readable medium can include a "Cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS). The at least one application can include, but is not limited to, for example, an application program that can accept connections to service requests from a destination communicating device by sending back responses to source communicating device(s). The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, a telecommunications network, or the Internet, any of which can be configured to communicate data via a wireless or a wired communication medium. These networks can run a variety of protocols not limited to TCP/IP, IRC or HTTP.

The term "node," as used in this disclosure, means a physical or virtual location in a computer network that comprises at least one computing resource.

The term "server," as used in this disclosure, means any combination of software or hardware, including at least one application or at least one computer to perform services for connected computing resources as part of a client-server architecture. The at least one server application can include, but is not limited to, for example, an application program that can accept connections to service requests from a communicating device by sending back responses to other communicating device(s). The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for automatically provisioning access privileges for a computing resource at a node in a computer network which includes a plurality of nodes, the method comprising:

receiving an access request for the computing resource at the node;
determining a service type and one or more validation criteria from information included in the access request, the service type being one of create, renew, modify, and revoke;
comparing the service type and the one or more validation criteria to a validation table;
determining if the access request is consistent with the validation table based on the comparison;
in response to determining the access request is consistent with the validation table:
automatically creating access privileges of a network user for the computing resource at the node without any user intervention when the service type is create;
automatically renewing the access privileges of the network user for the computing resource at the node without any user intervention when the service type is renew;
automatically modifying the access privileges of the network user for the computing resource at the node without any user intervention when the service type is modify; and
automatically revoking the access privileges of the network user for the computing resource at the node without any user intervention when the service type is revoke; and
transmitting a trigger to a network inventory system (NIS),
wherein the NIS comprises an information technology (IT) inventory server, and
wherein the access privileges for the computing resource comprise viewing, editing, and administrator privileges.

2. The method in claim 1, further comprising:
transmitting a trigger to the computing resource to
compare the service type and the one or more validation criteria to the validation table, and
apply access privileges included in the access request for the network user to the computing resource.

3. The method in claim 2, wherein the automatically creating, renewing, modifying, and revoking the access privileges of the network user for the computing resource at the node without any user intervention is executed by the computing resource in response to the trigger transmitted to the computing resource.

4. The method in claim 2,
wherein the trigger transmitted to the computing resource and the trigger transmitted to the NIS are sent by an automated approval application engine.

5. The method in claim 1, wherein the computing resource comprises a database server located in an information technology (IT) domain.

6. The method in claim 1, wherein the one or more validation criteria include at least one of an access type, a user type, a computing resource identification, an area of interest, and a subarea of interest.

7. A system for automatically provisioning access privileges for a node in a computer network that includes a plurality of nodes, the system comprising:
a memory and/or hardware processor; and
a network authentication and authorization ($NA^3$) controller that uses the memory and/or hardware processor in order to:
receive an access request for said node in the computer network;
determine a service type and one or more validation criteria from information included in the access request, the service type being one of create, renew, modify, and revoke;
transmit a trigger to a computing resource located at said node to compare the service type and the one or more validation criteria to validation criteria in a validation table, in order to determine if the access request is consistent with the validation table based on the comparison; and
transmit a further trigger to a network inventory system (NIS);
wherein in response to determining the access request is consistent with the validation table, the computing resource at said node automatically:
creates access privileges of a network user for the computing resource without any user intervention when the service type is create;
renews the access privileges of the network user for the computing resource without any user intervention when the service type is renew;
modifies the access privileges of the network user for the computing resource without any user intervention when the service type is modify; and
revokes the access privileges of the network user for the computing resource without any user intervention when the service type is revoke,
wherein the NIS comprises an information technology (IT) inventory server, and
wherein the access privileges for the node comprise viewing, editing, and administrator privileges.

8. The system in claim 7, wherein the computing resource comprises a database server.

9. The system in claim 7, wherein the one or more validation criteria include at least one of an access type, a user type, a computing resource identification, an area of interest, and a subarea of interest.

10. A non-transitory computer readable medium that stores instructions for automatically, without any user intervention, provisioning access privileges for a computing resource at a node in a computer network that includes a plurality of nodes comprising machine executable code which when executed by at least one computing device, causes the at least one computing device to perform steps comprising:
receiving an access request for the computing resource at the node;
determining a service type and one or more validation criteria from information included in the access request, the service type being one of create, renew, modify, and revoke;
comparing the service type and the one or more validation criteria to a validation table;
determining if the access request is consistent with the validation table based on the comparison;
in response to determining the access request is consistent with the validation table:
automatically creating access privileges of a network user for the computing resource at the node without any user intervention when the service type is create;
automatically renewing the access privileges of the network user for the computing resource at the node without any user intervention when the service type is renew;

automatically modifying the access privileges of the network user for the computing resource at the node without any user intervention when the service type is modify; and automatically revoking the access privileges of the network user for the computing resource at the node without any user intervention when the service type is revoke; and transmitting a trigger to a network inventory system (NIS), wherein the NIS comprises an information technology (IT) inventory server, and wherein the access privileges for the computing resource comprise viewing, editing, and administrator privileges.

11. The non-transitory computer readable medium in claim 10, further causing the at least one computing device to perform steps comprising:

transmitting a trigger to the computing resource to
compare the service type and the one or more validation criteria to the validation table, and
apply access privileges included in the access request for the network user to the computing resource.

12. The non-transitory computer readable medium in claim 11, wherein the automatically creating, renewing, modifying, and revoking the access privileges of the network user for the computing resource at the node without any user intervention is executed by the computing resource in response to the trigger.

13. The non-transitory computer readable medium in claim 11,
wherein the trigger transmitted to the computing resource and the trigger transmitted to the NIS are sent by an automated approval application engine.

14. The non-transitory computer readable medium in claim 10, wherein the computing resource comprises a database server located in an information technology (IT) domain.

* * * * *